(12) United States Patent
Pfeil

(10) Patent No.: US 6,788,743 B1
(45) Date of Patent: Sep. 7, 2004

(54) MODULATION OF A PRIMARY DATA CHANNEL REFERENCE CLOCK TO FORM A SEPARATE DATA COMMUNICATION CHANNEL

(75) Inventor: John W. Pfeil, Colorado Springs, CO (US)

(73) Assignee: LSI Logic Corporation, Milpitas, CA (US)

( * ) Notice: Subject to any disclaimer, the term of this patent is extended or adjusted under 35 U.S.C. 154(b) by 671 days.

(21) Appl. No.: 09/685,856

(22) Filed: Oct. 11, 2000

(51) Int. Cl.[7] .................................................. H04B 1/44
(52) U.S. Cl. ...................... 375/271; 375/219; 375/221; 375/238; 710/305
(58) Field of Search ................................ 375/221, 271, 375/219, 238; 331/1 R; 398/43

(56) References Cited

U.S. PATENT DOCUMENTS 5,778,204 A * 7/1998 Van Brunt et al. .......... 710/305
5,956,370 A * 9/1999 Ducaroir et al. ............ 375/221
6,351,489 B1 * 2/2002 Tetzlaff ....................... 375/238

* cited by examiner

*Primary Examiner*—Chieh M. Fan
*Assistant Examiner*—Edith Chang
(74) *Attorney, Agent, or Firm*—Suiter · West PC LLO

(57) ABSTRACT

The amount of data transmitted in a primary data channel is increased by modulating a reference clock signal of the primary data channel with secondary data to form a separate secondary data channel. Primary data is formed into a primary data signal using the modulated reference clock signal, and a transmitter transmits the primary data signal to a receiver. The receiver recovers the primary data and modulated reference clock signal from the primary data signal, and then recovers the secondary data from the recovered modulated reference clock signal.

9 Claims, 3 Drawing Sheets

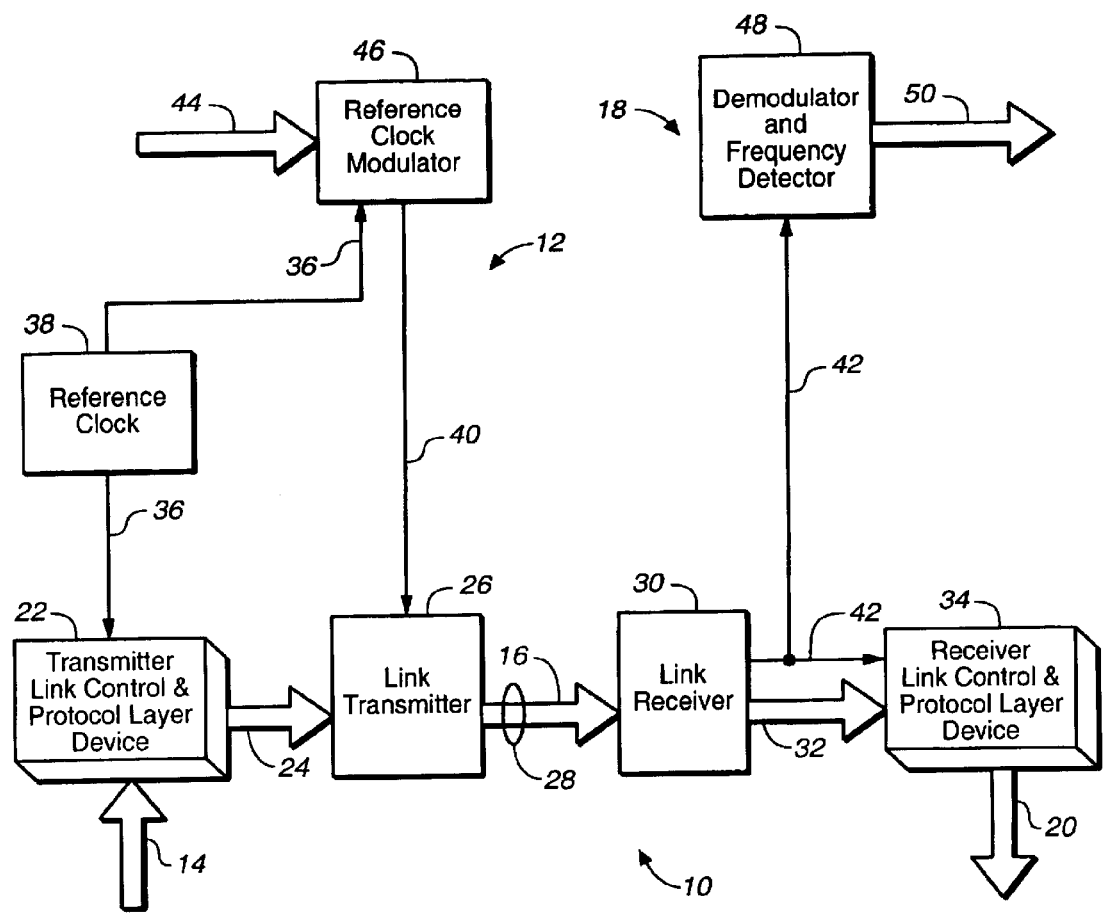
FIG._1

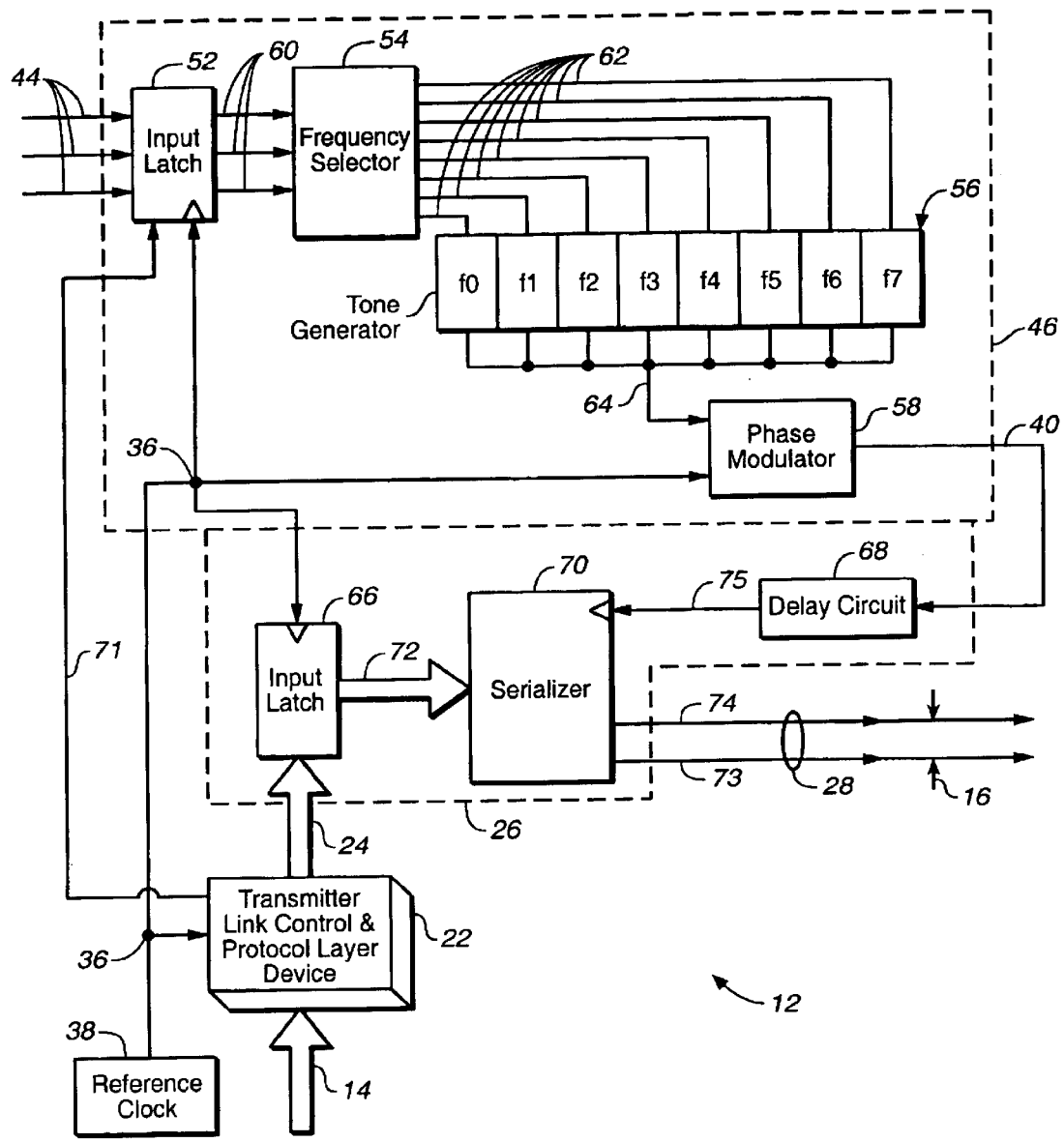
FIG._2

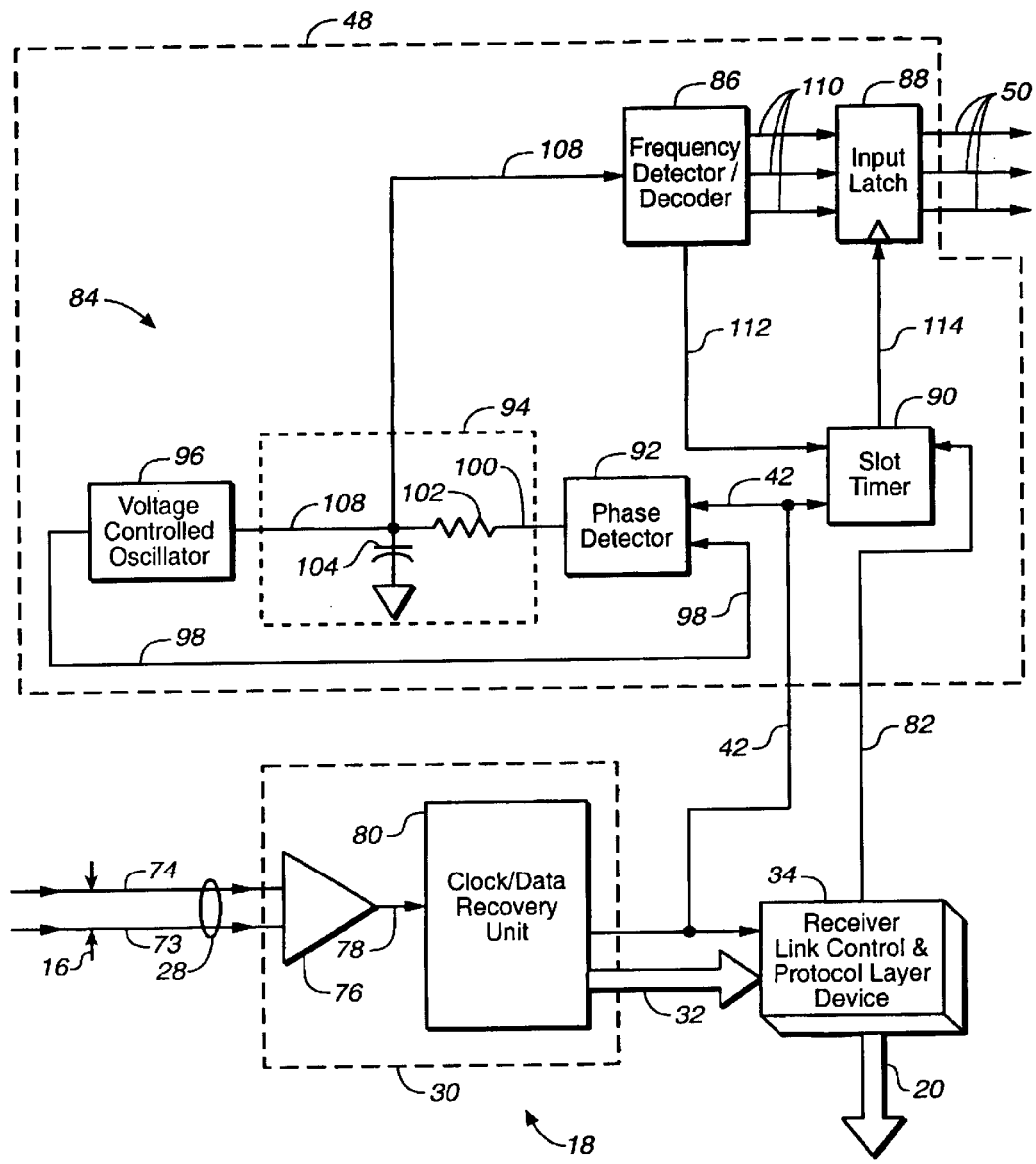
FIG._3

MODULATION OF A PRIMARY DATA CHANNEL REFERENCE CLOCK TO FORM A SEPARATE DATA COMMUNICATION CHANNEL

FIELD OF THE INVENTION

This invention relates to the communication of data over a data communications link. More particularly, the present invention relates to a new and improved technique of phase modulating a reference clock used for transmitting data in a primary data communication channel and thereby embedding a separate secondary data communication channel into the primary data communication channel without reducing the available bandwidth of the primary data communication channel.

BACKGROUND OF THE INVENTION

A serial data channel transfers data serially from a source to a destination over a serial data communication link. The serial data communication link is typically a wire conductor, radio frequency or optical link that spans a relatively long distance. The data is transferred over the serial data communication link and requires a reference clock at the destination to synchronize itself to the periodicity of the transmitted data. The data is formed from binary data bytes each composed of n binary bits. Each binary bit has a binary data bit value of "1" or "0". The transmitter unit of the serial data channel encodes binary data into a primary data transmission signal consisting of a sequence of high and low voltage levels that are transmitted at a periodicity established by a reference clock of the transmitter unit. The binary data bit values "1" and "0" are usually represented by high and low voltage states. Each binary data byte is transmitted during each clock cycle of the transmitter reference clock resulting in the transmission of n binary bits of the binary data byte during each clock cycle of the transmitter reference clock. Thus, the transmitted signal consists of a series of high and low voltage states in which the period of each voltage state is established by the transmitter reference clock frequency. The receiver unit of the serial data channel receives the signal consisting of a series of voltage levels and decodes the signal into a series of binary data bits representing the binary data encode and transmitted by the transmitter unit. In the process of decoding the signal, a reference clock of the receiver unit reconstructs or synchronizes to the transmitter reference clock, typically by using a phase-locked loop. The phase-locked loop reconstructs the transmitter reference clock from data transition points represented by changing voltage levels in the transmitted signal.

In known present serial data channels, data is transmitted only through a primary data communication channel over the serial data communication link as described above. The data transmitted may include primary data, such as data of a memory block or a disk sector, and secondary data, such as control or status information of the source. Any secondary information must be transmitted through the primary data communication channel, which consumes bandwidth of the serial data communication link. The quantity or bandwidth of the primary data transferred over the serial data communication link is reduced by the secondary information which is communicated over the primary data communication channel.

In other known serial data channels, primary data is transmitted though a primary data communication channel over a serial data communication link, and secondary data is transmitted in a secondary data communication channel over a separate secondary serial data communication link. The secondary serial data communication link typically has a lower bandwidth than the primary serial data communication link and is typically used for transmission of control and status information. The use of the secondary serial data communications link for communicating control and status information preserves the bandwidth of the primary data communication channel but adds cost and complexity related to setting up and using the secondary serial data communication link.

It is with respect to these and other considerations that the present invention has evolved.

SUMMARY OF THE INVENTION

One aspect of the present invention relates to a serial data communication link having a secondary data channel in addition to a primary data channel, where the secondary data channel is formed by modulating the reference clock of the primary data channel transmitter with secondary data rather than requiring the use of a separate secondary communications link. The secondary data channel does not diminish the integrity of the primary data channel or reduce the bandwidth of the primary data channel. The secondary data channel can be used to transmit secondary data, such as control and status information, simultaneously with the transmission of primary data over the primary data channel.

In accordance with these and other aspects, the invention includes a method of increasing the amount of data transmitted in a data channel established by transmitting primary data using a reference clock signal. The reference clock signal is modulated with secondary data to form a modulated reference clock signal containing the secondary data. Primary data is transmitted using the modulated reference clock signal and received as received primary data. The modulated reference clock signal and the primary data are recovered from the received primary data. The secondary data is recovered from the recovered modulated reference clock signal.

Other preferred aspects of the method include supplying a data byte value as the secondary data, selecting a modulation frequency signal corresponding to the data byte value, generating a modulation frequency signal having the selected modulation frequency, and combining the modulation frequency signal with the reference clock to form the modulated frequency clock signal prior to transmitting the primary data. Other preferred aspects of the method include demodulating the recovered modulated reference clock signal to form a recovered modulation frequency signal, and converting the recovered modulation frequency signal back into the secondary data.

In accordance with these and other aspects, the invention also includes a data channel having a secondary communication channel embedded in a primary communication channel for increasing the amount of data communicated through the data channel. The data channel includes a transmitter, and a receiver connected by a data link. The data channel also includes a reference clock modulator for modulating a reference clock signal with secondary data to form a modulated reference clock signal. The transmitter transmits the primary data using the modulated reference clock signal to a receiver over the data link. The receiver receives the primary data as received primary data and recovers the primary data and the modulated reference clock signal from the received primary data. The receiver also includes a demodulator and frequency detector which recovers the secondary data from the recovered modulated reference clock signal.

Other preferred aspects of the data channel include a latch for supplying the secondary data as a data byte value, a frequency selector for selecting a modulation frequency corresponding to the data byte value, a frequency generator for generating a modulation frequency signal having the modulation frequency, and a phase modulator for modulating the reference clock signal with the modulation frequency signal. Other preferred aspects of the data channel include a demodulator for recovering the modulation frequency signal from the recovered modulated reference clock signal as a recovered modulation frequency signal, and a frequency detector for converting the recovered modulation frequency signal back into the secondary data.

A more complete appreciation of the present invention and its improvements can be obtained by reference to the accompanying drawings, which are briefly summarized below, by reference to the following detailed description of a presently preferred embodiment of the invention, and by reference to the appended claims.

BRIEF DESCRIPTION OF THE DRAWINGS

FIG. 1 is a block diagram of a serial data communication link incorporating the present invention.

FIG. 2 is a more detailed block diagram of the serial data transmitter shown in FIG. 1.

FIG. 3 is a more detailed block diagram of the serial data receiver shown in FIG. 1.

DETAILED DESCRIPTION

A serial data channel 10 which incorporates the present invention is shown in FIG. 1. The serial data channel 10 includes a transmitter unit 12 which receives primary source data 14 which is to be transmitted over a serial data link 16, and a receiver unit 18 which receives the data transmitted over the serial data link 16 and supplies primary destination data 20 for use by other equipment (not shown) connected to the receiver unit 18. The primary destination data 20 supplied by the receiver unit 18 should be the same as the primary source data 14 supplied to the transmitter unit 12, under proper operating conditions of the serial data channel 10. The transmission of the primary source data 14 from the transmitter unit 12 through the serial data link 16 to the receiver unit 18 and the delivery of the primary destination data 20 from the receiver unit 18 is referred to herein as a primary data channel.

The transmitter unit 12 includes a conventional transmitter link control and protocol layer device 22 which encodes the primary source data 14 into primary supplied data 24 which is the basis for the data transmission over the serial data communications link 16. The primary supplied data 24 is applied to a link transmitter 26 which typically converts the primary supplied data 24 into serial differential signals 28 for conduction over the serial data link 16. The serial differential signals 28 are received from the serial data link 16 by a link receiver 30 at the receiver unit 18. The link receiver 30 converts the serial differential signals 28 into digital signals as primary received data 32, and applies the primary received data 32 to a conventional receiver link control and protocol layer device 34. The receiver link control and protocol layer device 34 decodes the primary received data 32 into the primary destination data 20. Although the primary supplied data 24 is transmitted through the link 16 as serial differential signals 28, the primary supplied data may be transmitted in other signal forms, so long as such signal forms are suitable for decoding into the primary received data 32.

The primary supplied data 24 preferably consists of a multi-bit wide byte of data generated in reference to the frequency of a reference clock signal 36 supplied by a reference clock 38. The reference clock 38 delivers the reference clock signal 36 at a predetermined fixed frequency. The transmitter link control and protocol layer device 22 receives the reference clock signal 36 and assembles the primary source data 14 into the primary supplied data 24. The link transmitter 26 receives the primary supplied data 24 in multi-bit bytes and converts it into the serial differential signals 28. The link transmitter 26 then delivers the serial differential signals 28 to the serial data communications link 16 at a frequency which is a multiple of the modulated reference clock signal 40. In a conventional primary data channel, the modulated reference clock signal 40 would be the same as the reference clock signal 36. However, in the present invention, the modulated reference clock signal 40 is a modulated version of the reference clock signal 36. The modulation of the reference clock signal 36 to form the modulated reference clock signal 40 permits transmission of secondary source data 44 in a secondary data channel in the manner described below.

The link receiver 30 receives the serial differential signals 28 from the serial data link 16. Based on the frequency at which the serial differential signals 28 occur, the link receiver 30 reconstructs the modulated reference clock signal 40 which was used by the link transmitter 26 as the basis for sending the serial differential signals 28 from the transmitter unit 12. The modulated clock signal which is recovered by the link receiver 30 is supplied as a recovered modulated reference clock signal 42 in the receiver unit 18. The link receiver 30 also converts the serial differential signals 28 into the primary received data 32, and the primary received data 32 is presented to the receiver link control and protocol layer device 34. Using the recovered modulated reference clock signal 42, the receiver link control and protocol layer device 34 assembles the primary received data 32 into the destination data 20. The destination data 20 corresponds to the primary source data 14.

The transmitter unit 12 also the transmits secondary source data 44 in a secondary data channel in addition to transmitting the primary source data 14 in the primary data channel. The secondary data channel is a part of the primary data channel, so a secondary data link is not needed. The secondary source data 44 is supplied to the transmitter unit 12 from other equipment (not shown). A reference clock modulator 46 receives the reference clock signal 36 from the reference clock 38 and modulates the reference clock signal 36 in accordance with the secondary source data 44 to form a modulated reference clock signal 40 carrying the secondary source data 44. The modulated reference clock signal 40 is supplied by the reference clock modulator 46 to the link transmitter 26, and the link transmitter 26 uses the modulated reference clock signal 40 to transmit the serial differential signals 28 over the serial data link 16. The modulation of the clock frequency at which the differential signals 28 are communicated in the primary data channel constitutes the secondary data channel which carries the data from the secondary data source 44.

The modulated reference clock signal 42 which is recovered by the link receiver 30 carries the secondary source data. The recovered modulated reference clock signal 42 is applied to a conventional demodulator and frequency detector 48 which demodulates the recovered modulated reference clock signal 42 to obtain the secondary source data 44 in the form of secondary destination data 50. The secondary destination data 50 is supplied to other equipment (not shown) which is connected to the receiver unit 18. The secondary data channel may be useful in communicating control and status information between the transmitter unit 12 and the receiver unit 18, as well as other information. The secondary data communicated by modulating the transmitter clock frequency and recovered from the serial differential signals received by the receiver is in addition to the primary data communicated in the primary data channel, and the communication of the secondary data does not adversely influence or limit the bandwidth of the primary data channel for carrying the primary data.

The degree of modulation of the reference clock signal 36 caused by the reference clock modulator 46 is within the specifications for clock frequency fluctuations in the serial data channel 10. Some degree of frequency fluctuation is permitted and under that limited fluctuation, the data transfer within the primary data channel is fully communicated. In other words, within a range of modulation of the transmitter clock frequency, the data transfer in the primary data channel is unaffected. It is within this range of acceptable frequency fluctuation that the transmitter clock frequency is modulated.

By modulating the transmitter reference clock signal 36 within the acceptable range of frequency fluctuation to achieve effective primary channel data communications, the secondary source data 44 is communicated and recovered as the secondary destination data 50 without degrading or diminishing the effectiveness of communicating the primary data in the primary data channel. Moreover, because the secondary source data 44 is communicated through modulation of the transmitter reference clock frequency, a separate physical link for communicating the secondary data is not required. The secondary data channel is embedded in the primary data communicated in the primary data channel, in the form of the modulation of the differential signals in the data link 16. Data in the secondary data channel is communicated in addition to the data communicated in the primary data channel without an additional link and without diminishing the bandwidth of the primary data channel for communicating the primary data, thereby increasing the bandwidth or data transmission capability of the serial data channel 10.

More details of the transmitter unit 12 are described in conjunction with FIG. 2. The transmitter link control and protocol layer device 22 is conventional and contains the typical elements and functionality to encode the primary source data 14 into the primary supplied data 24. The transmitter link control and protocol layer device 22 operates with respect to the transmitter reference clock signal 36, and primarily assembles the primary source data 14 into multi-bit bytes which are supplied as the primary supplied data 24. The assembly of the primary source data 14 into the multi-bit bytes of the primary supplied data 24 is accomplished in reference to the clock signal 36. In general, the transmitter reference clock signal 36 synchronizes all of the elements of the transmitter unit 12.

The reference clock modulator 46 of the transmitter unit 12 includes a secondary data input latch 52, a frequency selector 54, a tone generator 56, and a phase modulator 58. The secondary data input latch 52 latches individual bits of the secondary source data 44 using the clock signal 36 as a reference. The latched bits of secondary source data 44 are supplied by the secondary data input latch 52 as secondary digital data at 60. The function of the secondary input latch 52 is to insure that the data from the secondary data source 44 is stable and coordinated according to the transmitter reference clock signal 36. Without using the secondary input latch 52, the status of the secondary source data 44 relative to the status of the primary source data 14, as converted into the primary supplied data 24 by the transmitter link control and protocol layer device 22, would not be coordinated. Without such coordination, the secondary source data could not be reliably transmitted by modulation of the reference clock signal.

The latched secondary data 60 is supplied to the frequency selector 54. The frequency selector 54 is preferably a 3-to-8 decoder. The frequency selector 54 receives the latched secondary data 60 in three-bit bytes from the secondary data input latch 52 and drives one of eight frequency selection lines 62 in accordance with the logical levels of the three bits applied to its input. Each different logical configuration of the three bits of the byte applied to the frequency selector 54 causes an output drive signal to be applied to one of the frequency selection lines 62. Only one of the frequency selection lines 62 is energized for each of the three-bit bytes of latched secondary data 60 applied to the frequency selector 54.

The frequency selection lines 62 are connected as inputs to the tone generator 56. In response to a drive signal on one of the frequency selection lines 62, the tone generator 56 supplies an output frequency signal at 64. Each signal on the different frequency selection lines 62 causes the tone generator 56 to supply an output signal of a different predetermined frequency. Thus, the tone generator 56 supplies output signals at 64 at each of eight different predetermined frequencies. A drive signal on each of the different frequency selection lines 62 activates that tone generator 56 to supply a different frequency output signal at 64.

In essence, each of the eight different bit patterns of the three-bit bytes of latched secondary data 60 causes a different frequency output signal at 64. The correlation between the eight different bit patterns of the three-bit bytes of latched secondary data 60 and the different frequency output signals at 64 is established as the basis for the communication of the secondary source data between the transmitter unit 12 and the receiver unit 18 (FIGS. 1 and 3).

The frequency output signals at 64 are supplied to one input terminal of the phase modulator 58. The other input terminal of the phase modulator 58 receives the transmitter reference clock signal 36. Both input signals 36 and 64 supplied to the phase modulator 58 are frequency based signals. The phase modulator 58 modulates the transmitter reference clock signal 36 with the frequency output signals 64 forming the modulated reference clock signal 40.

The link transmitter 26 includes a primary data input latch 66, a delay circuit 68, and a conventional data serializer 70. The primary data input latch 66 receives and latches the primary supplied data 24 from the transmitter link control and protocol layer device 22. The primary supplied data 24 is latched by the primary data input latch 66 in reference to the reference clock signal 36. In order to insure that the secondary data input latch 52 also latches the secondary source data 44 in synchronism with the latching of the primary source data 24 by the primary data input latch 66, the transmitter link control and protocol layer device 22 supplies a control signal at 71 to the secondary data input latch 52. The secondary data input latch 52 requires the presence of both the control signal 71 and the reference clock signal 36 in order to achieve its latching. In this manner, one three-bit byte of secondary source data 44 is latched and supplied at 60 in synchronism with one multi-bit byte of primary source data 24. The primary input latch 66 supplies the multi-bit byte of primary source data as latched primary data at 72. The delay circuit 68 receives the modulated reference clock signal 40 from the phase modulator 58 and supplies a delayed modulated reference clock signal 75 to the data serializer 70. The delay circuit 68 slightly delays the application of the modulated reference clock signal 40 to the data serializer 70 to ensure that setup and hold time requirements of the data serializer 70 are met.

The latched primary data at 72 is supplied to the data serializer 70. The data serializer 70 is conventional and contains the typical elements and functionality to serialize multi-bit bytes of latched primary data 72 into series of the differential signals 28. Preferably, the data serializer 70 includes a multi-phase phase-locked loop to internally multiply the delayed modulated reference clock signal 75 and to supply the latched primary data 72 to the serial data link 16 at a rate which is a multiple of the delayed modulated reference clock signal 75. The differential signals 28 are supplied over a pair of conductors 73 and 74 which constitute the serial data link 16. The serial data link 16 preferably includes a FibreChannel link. The conductors 73 and 74 allow the differential signals 28 to be transmitted and received by the relative reference of the voltages on the conductors 73 and 74. In a conventional manner, the data serializer 70 transforms the latched primary data 72 into a series of differential signals 28 by transforming the data bits of the multi-bit bytes of the latched primary data 72 into a serial stream of high and low voltage transitions corresponding to the bit values.

More details of the receiver unit 18 are described in conjunction with FIG. 3. The link receiver 30 includes a differential amplifier 76, and the conductors 73 and 74 of the link 16 are connected to two input terminals of the differential amplifier 76. The differential amplifier 76 amplifies the serial differential signals 28 supplied by the link 16, and delivers a digital signal 78 from its output terminal to a clock and data recovery unit 80. The digital signal 78 supplied by the differential amplifier 76 is in a high logic state so long as one of the conductors 73 or 74 is higher in potential than the other, and is in a low logic state so long as the potential on the conductors 73 and 74 is reversed.

The clock and data recovery unit 80 is also conventional and contains the typical elements and functionality to generate the recovered modulated reference clock signal 42 from the digital signal 78. The modulated reference clock signal 42 is recovered from the timing of the transitions of the digital signal 78. The clock and data recovery unit 80 uses the recovered modulated reference clock signal 42 to transform the digital signal 78 into the primary received data 32. The clock and data recovery unit 80 assembles the serial differential signals 28 into multi-bit bytes of the same bit length as the bit length of the multi-bit bytes of primary supplied data 24 present in the transmitter unit 12 (FIG. 2). The primary received data 32 is therefore substantially of the same characteristics as the primary data 24 of the transmitter unit 12 (FIG. 2) and carries the same information. The received primary data 32 is supplied to the receiver link control and protocol layer device 34 of the receiver unit 18.

The receiver link control and protocol layer device 34 is conventional and contains the typical elements and functionality to decode the primary received data 32 into the primary destination data 20 using the recovered modulated reference clock signal 42. The receiver link control and protocol layer device 34 also generates a control signal 82 using boundaries set by the receiver link control and protocol to indicate the beginning of each byte of primary destination data 20. The control signal 82 is used by the demodulator and frequency detector circuit 48 of the receiver unit 18 to demodulate and deliver each successive byte of secondary destination data 50. In a typical embodiment, the demodulator and frequency detector circuit 48 demodulates and delivers one byte of secondary destination data 50 for about three thousand bytes of primary destination data 20 delivered by the receiver 18. In order for the modulation frequency to manifest itself as a unique information-carrying signal, a relatively large volume of data, relative to the phase modulation rate, should be received.

The demodulator and frequency detector 48 includes a phase-locked loop detector 84, a frequency detector and decoder 86, a secondary data output latch 88 and a slot timer 90. The phase-locked loop detector 84 includes a phase detector 92, a loop filter 94 and a voltage controlled oscillator 96. The phase detector 92 receives a phase reference signal 98 from the voltage controlled oscillator 96 and the recovered modulated reference clock signal 42 as input signals. The phase detector 92 compares the phases of its two input signals 42 and 98. If the two signals 42 and 98 are out of phase, the phase detector 92 generates and supplies an error voltage signal 100 corresponding to a phase difference. The error voltage signal 100 preferably increases in magnitude with a greater phase difference between the two input signals 42 and 98, and decreases in magnitude with a lesser phase difference between the two input signals 42 and 98. When the two input signals 42 and 98 are comparable in magnitude, the error signal 100 is at a middle value.

The error signal 100 is applied to the loop filter 94. The loop filter 94 includes a resistor 102 and a capacitor 104 which form a conventional RC filter for filtering out the high frequency components of the error signal 100. Preferably, the loop filter 94 readily passes frequencies in the range up to the maximum modulation frequency of the modulated reference clock signal 42 compared to unmodulated reference clock signal 36 (FIGS. 1 and 2), but blocks signals higher than the maximum permitted modulation frequency. The response time of the loop filter 94 ensures that the error signal 100 produced by the phase detector 92 does not achieve a steady state when the reference clock 38 (FIG. 1) is modulated.

An output signal 108 from the loop filter 94 is developed across the capacitor 104. The output signal 108 is a voltage value which is related to the magnitude of the error signal 100 by the filtering characteristics of the loop filter 94. The output signal 108 from the loop filter 94 is applied to the voltage controlled oscillator 96. The output frequency from the voltage controlled oscillator 96, which is the phase reference signal 98, is modified by the level of the input signal 108 applied to it. The loop filter 94 determines a response time from the influence of the error signal 100 from the phase detector 92 to the time in point when the voltage controlled oscillator 96 can correct for the error signal 100. The base or normal frequency of the voltage controlled oscillator 96 is approximately the same frequency as the unmodulated transmitter reference clock signal 36 (FIGS. 1 and 2). The modulation of the recovered modulated clock signal 42 causes the phase detector 92 to supply an output frequency signal 100 having a frequency that is the difference between the frequencies of the phase reference signal 98 and the recovered modulated clock reference signal 42. The change in frequency of the voltage controlled oscillator 96 will thereby attempt to track the frequency of the recovered modulated reference clock signal 42. However, the continual modulation of that signal will result in a phase or frequency difference which is present in the recovered modulation frequency signal 108.

The error signal 100 from the phase detector 92 is a signal whose magnitude represents the difference between the phase reference signal 98 and the recovered modulated clock reference signal 42. Because the phase of the recovered modulated reference clock signal 42 is constantly changing, the error signal 100 generated by the phase detector 92 is also constantly changing. The modulation of the recovered modulated clock reference signal 42 prevents the error signal 100 from the phase detector from achieving a steady state. The error signal 100 changes as a function of a sinusoid. It is the frequency of this sinusoidally varying error signal 100 that carries the information contained in the secondary data channel.

There is a finite response time from when a phase error is observed at the phase detector 42 and the time when the voltage controlled oscillator 96 can correct for that phase error. The loop filter 94, which is essentially a low pass filter, determines the rate at which this reaction takes place. Additionally, the loop filter 94 filters out high frequency components, which might influence the recovered modulation frequency signal 108. Because the voltage controlled oscillator 96 can not instantaneously correct a phase error of the input signals 42 and 98 to the phase detector 92 in an environmental of the continually changing relationship between the signals 42 and 98, the error signal 100 and the output signal 108 are constantly changing. It is the sinusoidal content of the changing recovered modulation output frequency signal 108 which comprises the information that the demodulator and frequency detector 48 decodes as the secondary data 110.

The recovered modulation frequency signal 108 is supplied to the frequency detector and decoder 86. The frequency detector and decoder 86 detects particular frequencies or frequency ranges in the recovered modulation frequency signal 108 and correlates each of those frequencies into one of the three-bit data bytes which form recovered secondary data 110. As was discussed previously in connection with the transmitter unit 12 shown in FIG. 2, the frequency selector 54 and the tone generator 56 create one of eight different frequency signals supplied at 62 for each of the eight, three-bit byte patterns of latched secondary data 60. The phase-locked loop detector 84 and the frequency detector and decoder 86 of the receiver unit shown in FIG. 3 perform the reverse function by correlating the eight different frequencies of the recovered modulation frequency signal 108 into corresponding three-bit byte patterns.

The frequency detector and decoder 86 also supplies a frequency change signal 112 when the frequency detector and decoder detects a different frequency or frequency range in the recovered modulation frequency signal 108. The slot timer 90 receives, as inputs, the frequency change signal 112, the recovered modulated reference clock signal 42, and the control signal 82. The slot timer 90 responds to these three signals 42, 82 and 112 to recognize the boundary between separate three-bit bytes of recovered secondary data 110. The slot timer 90 supplies a latch enable signal 114 to the secondary data output latch 88 to clock into and latch the three-bit byte of recovered secondary data 110, thereby causing the secondary output latch 88 to supply the secondary destination data 50. The slot timer 90 asserts the latch enable signal 114 in response to an active control signal 82 from the receiver link control and protocol layer device 34 for each valid data byte of recovered secondary data 110 which it supplies as the secondary destination data 50. Optionally, the slot timer 90 may assert the latch enable signal 114 in response to the frequency change signal 112 received from the frequency detector and decoder 86.

The previous description has explained that a secondary data channel is effectively or logically embedded in a primary data channel as a result of phase modulating the reference clock of the primary data channel with secondary source data. The bandwidth of the primary data channel is not reduced and the integrity of the primary source data over the primary data channel is not compromised. The introduction of the secondary source data for transmission is essentially transparent with respect to the primary data channel. The secondary data channel may be used for effectively transmitting control and status information through the secondary data channel without diminishing the capability of the primary data channel to transmit primary data. Many other advantages and improvements will be apparent after gaining a complete understanding of the present invention.

A presently preferred embodiment of the invention has been shown and described with a degree of particularity. This description is of a preferred example of the invention. In distinction to its preferred examples, it should be understood that the scope of the present invention is defined by the scope of the following claims, which should not necessarily be limited to the detailed description of the preferred embodiments set forth above.

The invention claimed is:

1. A method of increasing the data communicated in a data channel established by transmitting a primary data using a reference clock signal, including the steps of:

modulating the reference clock signal with a secondary data to form a modulated reference clock signal containing the secondary data;

transmitting the primary data using the modulated reference clock signal;

receiving the primary data as received primary data;

recovering the modulated reference clock signal from the received primary data to form a recovered modulated reference clock signal;

recovering the primary data from the received primary data to form a recovered primary data; and recovering the secondary data from the recovered modulated reference clock signal to form a recovered secondary data, wherein the step of modulating the reference clock signal with secondary data includes the steps of:

supplying a data byte value as the secondary data;

selecting a modulation frequency corresponding to the data byte value;

generating a modulation frequency signal having the selected modulation frequency; and combining the modulation frequency signal with the reference clock signal to form the modulated reference clock signal prior to transmitting the primary data.

2. A method of increasing the data communicated in a data channel established by transmitting a primary data using a reference clock signal, including the steps of:

modulating the reference clock signal with a secondary data to form a modulated reference clock signal containing the secondary data;

transmitting the primary data using the modulated reference clock signal;

receiving the primary data as received primary data;

recovering the modulated reference clock signal from the received primary data to form a recovered modulated reference clock signal;

recovering the primary data from the received primary data to form a recovered primary data; and recovering the secondary data from the recovered modulated reference clock signal to form a recovered secondary data, wherein the step of recovering the secondary data from the recovered modulated reference clock signal further includes the steps of:

demodulating the recovered modulated reference clock signal to form a recovered modulation frequency signal; and converting the recovered modulation frequency signal back into the secondary data, the step of converting the recovered modulation frequency signal back into the secondary data further comprises the steps of:

detecting a frequency of the recovered modulation frequency signal; and converting the detected frequency back into the secondary data as recovered secondary data.

3. A method of increasing the data communicated in a data channel established by transmitting a primary data using a reference clock signal, including the steps of:

modulating the reference clock signal with a secondary data to form a modulated reference clock signal containing the secondary data;

transmitting the primary data using the modulated reference clock signal;

receiving the primary data as received primary data;

recovering the modulated reference clock signal from the received primary data to form a recovered modulated reference clock signal;

recovering the primary data from the received primary data to form a recovered primary data; and recovering the secondary data from the recovered modulated reference clock signal to form a recovered secondary data, wherein the step of recovering the secondary data from the recovered modulated reference clock signal further includes the steps of:

recovering a modulation frequency signal from the recovered modulated reference clock signal by using a phase-locked loop to form a recovered modulation frequency signal; and converting the recovered modulation frequency signal back into the secondary data.

4. A method as defined in claim 3 wherein the step of recovering the modulated frequency signal from the recovered modulated reference clock signal further includes the steps of:

generating a phase reference signal;

determining a phase difference between the recovered modulated reference clock signal and the phase reference signal;

generating an error signal corresponding to the phase difference; and correlating the recovered modulation frequency signal to the error signal.

5. A method as defined in claim 4 wherein the step of recovering the modulated frequency signal from the recovered modulated reference clock signal further includes the steps of:

passing the error signal through a filter to correlate the recovered modulation frequency signal to the error signal;

generating the phase reference signal from the recovered modulation frequency signal.

6. A data channel having a secondary communication channel embedded in a primary communication channel for increasing the amount of data communicated through the data channel, the data channel having a data link between a transmitter and a receiver, and a reference clock for generating a reference clock signal used as a reference for transmitting primary data over the data link to the receiver, said data channel comprising:

a reference clock modulator for modulating the reference clock signal with a secondary data to form a modulated reference clock signal;

the transmitter transmitting the primary data to the receiver using the modulated reference clock signal;

the receiver receiving the primary data from the transmitter as received primary data, recovering the modulated reference clock signal from the received primary data as a recovered modulated reference clock signal, and recovering the primary data from the received primary data; and a demodulator and frequency detector for recovering the secondary data from the recovered modulated reference clock signal; wherein the reference clock modulator further comprises:

a latch for supplying a data byte as the secondary data;

a frequency selector for selecting a modulation frequency corresponding to the data byte:

a frequency generator for generating a modulation frequency signal having the selected modulation frequency; and a phase modulator for modulating the reference clock signal with the modulation frequency signal.

7. A data channel as defined in claim 6 wherein the demodulator and frequency detector further comprises:

a demodulator for recovering the modulation frequency signal from the recovered modulated reference clock signal as a recovered modulation frequency signal; and a frequency detector and decoder for converting the recovered modulation frequency signal back into the secondary data.

8. A data channel as defined in claim 7 wherein the demodulator comprises a phase-locked loop.

9. A data channel as defined in claim 7 wherein the demodulator comprises:

a voltage controlled oscillator for generating a phase reference signal;

a phase detector for detecting a phase difference between the recovered modulated reference clock signal and the phase reference signal and for generating an error signal corresponding to the phase difference; and a filter for removing frequency components above the selected modulation frequency from the error signal to form the recovered modulation frequency signal.

* * * * *